United States Patent [19]
Friedrich

[11] Patent Number: 5,325,360
[45] Date of Patent: Jun. 28, 1994

[54] CONTROLLABLE PCM STATE MACHINE USER INTERFACE

[75] Inventor: Walter R. Friedrich, Pleasanton, Calif.

[73] Assignee: National Semiconductor Corporation, Santa Clara, Calif.

[21] Appl. No.: 988,246

[22] Filed: Dec. 9, 1992

[51] Int. Cl.$^5$ .............................................. H04L 12/42
[52] U.S. Cl. .................................. 370/85.5; 370/85.15
[58] Field of Search .............................. 370/85.1–85.5, 370/68.1, 110.1, 60, 60.1, 94.1, 94.2, 94.3; 340/825.05, 825.06, 825.3; 395/200

[56] References Cited

U.S. PATENT DOCUMENTS

| | | | |
|---|---|---|---|
| 5,031,174 | 7/1991 | Natsume | 370/85.5 |
| 5,046,182 | 9/1991 | Hamstra et al. | 370/85.5 |
| 5,182,747 | 1/1993 | Frenzel, III et al. | 370/85.15 |

OTHER PUBLICATIONS

Excerpt from an Advanced Micro Devices Databook. MC68837-FDDI Elasticity Buffer and Link Manager Preliminary Specification.

*Primary Examiner*—Douglas W. Olms
*Assistant Examiner*—Hassan Kizou
*Attorney, Agent, or Firm*—Hickman & Beyer

[57] ABSTRACT

A controllable physical connection management (PCM) state machine user interface is described for use in the physical layer controller of a station or concentrator capable of insertion into a data transmission network that operates substantially in accordance with the FDDI protocol. In one aspect of the invention, the interface permits the user to direct the PCM state machine to pause after entering a particular state during the initial connection management sequence. In another aspect of the invention, the interface permits a user to force a state transition by writing the desired new state into a state register. These user interface features allow the state transitions to be controlled by the user and therefore possibly changed. In a preferred embodiment, the user initiated state transition can occur while the PCM state machine is paused.

24 Claims, 8 Drawing Sheets

CONTROLLABLE PCM STATE MACHINE USER INTERFACE

BACKGROUND OF THE INVENTION

1. Field of the Invention

The present invention relates generally to management of the initial communication between a pair of stations in a data transmission network, prior to the insertion of a new station into the data transmission ring. More particularly, a state machine user interface is provided that permits the user to control the connection management sequence.

2. Discussion of the Prior Art

One type of high speed data transmission network is defined by the Fiber Distributed Data Interface (FDDI) protocol. The FDDI protocol is an American National Standards Institute (ANSI) data transmission standard which applies to a 100 Mbit/second token ring network that utilizes an optical fiber transmission medium. The FDDI protocol is intended as a high performance interconnection between a number of computers as well as between the computers and their associated mass storage subsystem(s) and other peripheral equipment.

Information is transmitted on an FDDI ring in frames that consist of 5-bit characters or "symbols", each symbol representing 4 data bits. Information is typically transmitted in symbol pairs or "bytes". Tokens are used to signify the right to transmit data between stations. The FDDI standard includes a thirty-two member symbol set. Within the set, sixteen symbols are data symbols (each representing 4 bits of ordinary data) and eight are control symbols. The eight control symbols are: J (the first symbol of a start delimiter byte JK), K (the second symbol of a start delimiter byte JK), I (Idle), H (Halt), Q (Quiet), T (End Delimiter), S (Set) and R (Reset). The remaining eight symbols of the FDDI standard symbols set are not used since they violate code run length and DC balance requirements of the protocol. These are referred to as V (violation) symbols.

In operation, a continuous stream of control symbol patterns defines a "line stat". The FDDI protocol defines several line states, which include the following line states that are used during the connection management sequence:

(1) Idle Line State (ILS), which is a continuous stream of Idle symbols;
(2) Quiet Line Sate (QLS), which is a continuous stream of Quiet symbols;
(3) Halt Line State (HLS), which is a continuous stream of Halt symbols;
(4) Master Line State (MLS), which is an alternating stream of Halt and Quiet symbols; and
(5) Active Line State (ALS), which is the state used to transmit data units (frames)

The FDDI Station Management (SMT) standard provides the necessary control of an FDDI station (node) so that the node may work cooperatively as a part of an FDDI network. To effectively implement the functions required, SMT is divided into three entities, namely the Connection Management entity (CMT), the Ring Management entity (RMT) and the Frame Based Services. The Connection Management (CMT) is the management entity in the Station Management that is responsible for the station's port(s), as well as the connection to the ports of neighboring stations.

The Connection Management is further divided into three sub-entities. They include, the Physical Connection Management (PCM), Configuration Management (CFM) and Entity Coordination Management (ECM).

The introduction of an FDDI station (node) into the data flow path of the FDDI ring is governed by the Physical Connection Management (PCM) entity. One of the most important functions of Physical Connection Management (PCM) is to establish a connection between two ports that are directly connected. The connection process is achieved through a lock-step handshaking procedure. In the basic FDDI sequence, the handshaking procedure controlled by the PCM is divided into three stages. They include an initialization sequence, a signaling sequence and a join sequence. The initialization sequence is used to indicate the beginning of the PCM handshaking process. It forces the neighboring PCM into a known state so that the two PCM state machines can run in a lock-step fashion.

Following the initialization sequence is the signaling sequence. The signaling sequence communicates basic information about the port and the node with the neighboring port. A Link Confidence Test (LCT) is also conducted during the signaling sequence to test the link quality between the two ports. If the link quality is not acceptable or the type of connection is not supported or is currently not accepted by the nodes then the connection will be withheld. If the connection is not withheld during the signaling sequence, the PCM state machine can move on to the join sequence and establish a connection between the two neighboring ports.

In order to manage the initial connection between the ports of separate stations, the PCM manages the physical layer, controls the line-states transmitted during initiation and monitors the line-states received during the connection initialization. The PCM block itself is generically subdivided into two entities. The PCM State Machine and the Pseudo Code. The PCM State Machine contains all the state and timing information of the PCM and provides a signalling channel. The Pseudo Code specifies the bits that are to be signalled by the PCM State Machine and processes the bits received from the PCM at the other end of the link.

A general description of the Station Management standard, as well as each of its subparts, including the PCM is described in detail in the draft ANSI FDDI Station Management Standard, dated Jun. 25, 1992, which is incorporated herein by reference.

Figure 1:
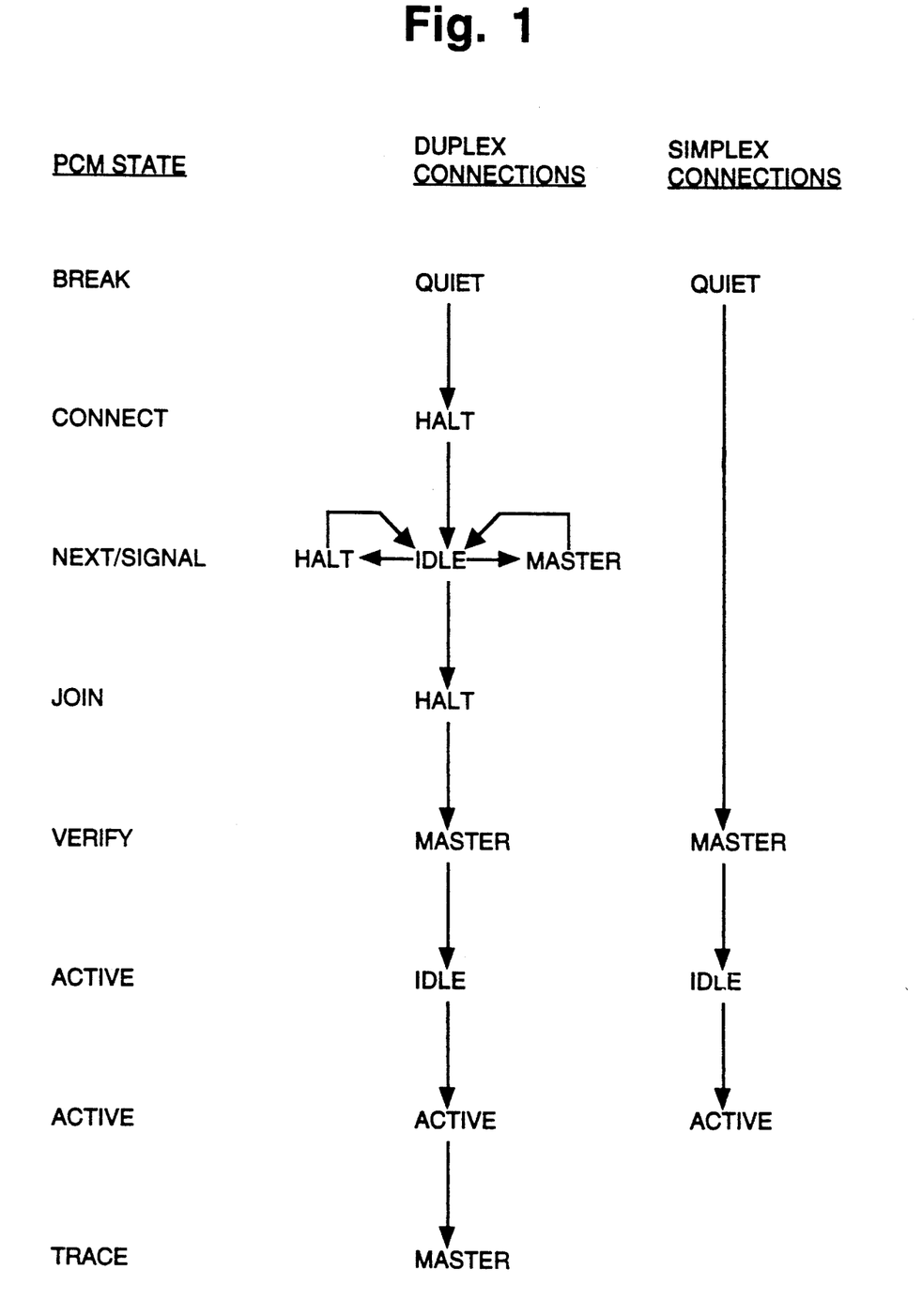
FIG. 1 is a flow diagram showing the PCM states encountered when initiating both duplex and simplex station connections.

The basic FDDI protocol has a defined connection management sequence for making a duplex connection between a pair of stations. As seen in FIG. 1, the PCM State Machine is likely to enter a total of seven states during the connection sequence. These include the following states: PC1:Break; PC3:Connect; PC4:Next; PC5:Signal; PC6:Join; PC7:Verify; and PC8:Active. There are three other states that the PCM is generally capable of entering as well. That is, PC0:Off, PC2:Trace and PC9:Maint. The PC0:Off state occurs when the port is shut down. PC2:Trace relates to locating faults in the token ring. PC9:Maint relates to maintenance functions.

The Off state (PC0) is the initial state of the PCM State Machine. The PCM returns to this state upon the reception of a PC_Stop signal. In the Off state, the Physical Layer (PHY) device transmits Quiet symbols and the optical transmitter may be disabled. The Break State (PC1) is the beginning of the PCM connection sequence. The Break state is entered upon the reception of the PC_Start signal. The Break state is also entered from any other state when the connection sequence cannot be completed and a reinitialization is required for any reason.

The Connect state (PC3) is used to synchronize two ports to establish an initial contact and to begin the signaling sequence. In the Connect state, the optical transmitter is enabled and a continuous stream of Halt symbols is transmitted. When a Halt line state is received from the adjacent node, the state machine leaves the Connect state and enters the Next state (PC4). On the other hand, if an Idle line state is received before a Halt line state, then the connection is not synchronized and the state machine transits to the Break state to restart the connection sequence.

The Next state (PC4) is one of the two states used in the signaling sequence. The main purpose of the Next state is to separate the "bit" signaling performed in the Signal state (PC5). The Next state is also used to transmit Protocol Data Units (PDUs) while a loop test such as a Link Confidence Test or optionally, a Media Access Control Layer (MAC) Local Loop Test is performed. The PCM Pseudo Code machine is also started in the Next State. On initial entry into the Next state, a continuous stream of Idle symbols is transmitted. While in the Next state, either a continuous stream of Idle symbols or a PDU symbol stream is transmitted.

The Next state terminates and the state machine transits to the Signal state (PC5) upon the reception of either a Halt or a Master line states after a loop test. The same transition is made when a PC_Signal signal is received from the Pseudo Code machine. When a PC_Join signal is received, a transition is made to the Join state. If for any reason a Quiet line state is received while the state machine is in the Next state, the state machine transits to the Break state to permit a restart.

The Signal state is the second state used in the signaling sequence. In the Signal state, individual bits of information are communicated between ports by transmitting either Halt symbols or Master symbol pairs. The transmission of a Halt line state is equated with a logical one, and the transmission of the Master line state is a logical zero. Once each individual bit has been transmitted and received, the state machine returns to the Next state (i.e. the transmission of the Idle line state), before returning to the Signal state to transmit the next bit of information. Thus, the Next state is used as a bit delimiter between two signaling bits. When all signal bits have been transmitted and received, the Signaling sequence ends.

The Join state (PC6) is the first of three states in the join sequence that leads to an active connection. The join sequence assures that both ends of a connection enter the Active state together at the completion of the sequence. The Join state is entered upon the completion of the signal sequence when the PC_Join signal is issued from the Pseudo Code machine. In the Join state, a continuous stream of Halt symbols is transmitted.

The Verify state (PC7) is the second of the three join sequence states. The Verify state is entered when the Halt line state is received from the adjacent node. In the Verify state, the PCM transmits a Master line state. The Join and Verify states combine to produce a sequence of line states, the halt line state followed by the master line state, which is unique in the connection management sequence.

The Active state (PC8) is the last of the three states in the join sequence. In this state, a continuous stream of Idle symbols is transmitted. Upon the reception of an Idle line state from the adjoining node, the physical layer device is allowed to enter the Active Transmit Mode and thus becomes part of the active ring. In addition to the normal break conditions, if a Halt line state is received in place of the Idle line state, the connection is not synchronized and a reinitialization of the connection is required. Similarly, if the Link Error Rate is too high, the connection must be reinitialized.

Figure 2A:
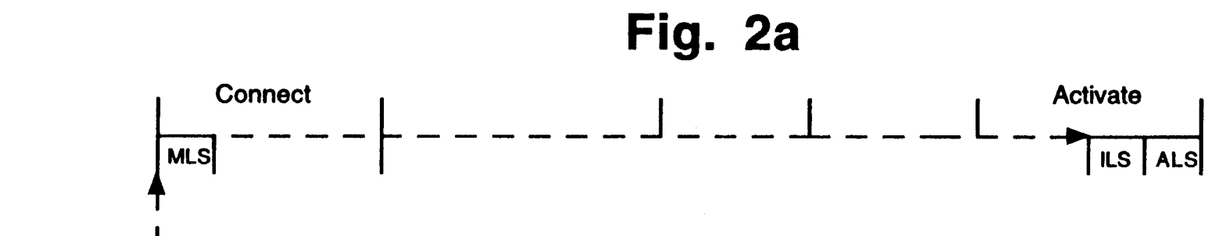
FIGS. 2a-2c are the connection sequences for FDDI-II Simplex, FDDI-I and FDDI-II Duplex connections.
Figure 2B:
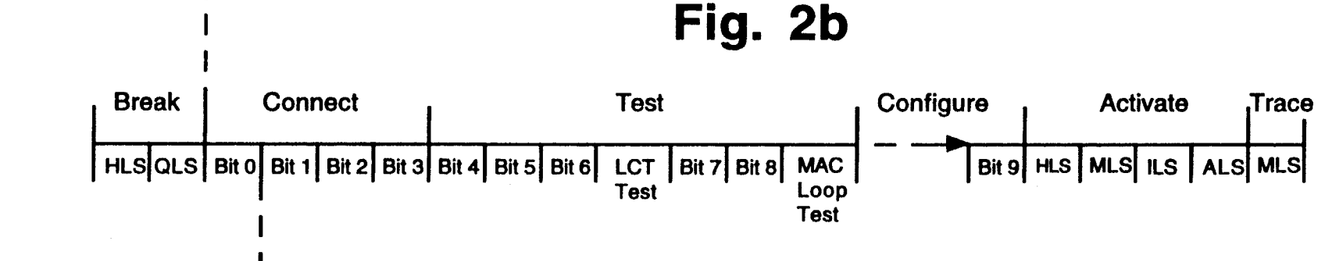
Figure 2C:
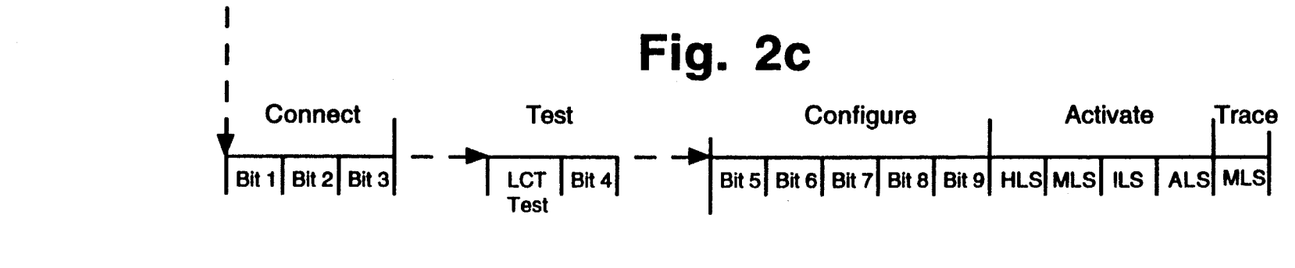

The basic FDDI protocol (referred to as FDDI-1) has a defined connection management sequence as seen in FIG. 2b. The ANSI standards committee is currently working on an enhanced version of FDDI, which is generally referred to as the FDDI-II standard. At the time of this writing, the connection management sequence for FDDI-II had not been finalized. However, there are several proposed connection management sequences for FDDI-II. One such proposed sequence for a duplex connection is shown in FIG. 2c. As seen therein, it is expected that the sequence will be generally similar schematically to the protocol for a FDDI-I connection. Similarly, the state machine for a FDDI-II duplex connection is expected to be essentially the same as the state machine for a basic FDDI-1 connection. However, the information carried in the various pseudo code bits is expected to be somewhat different.

Although the FDDI protocol is based primarily on the concept of a dual ring wherein communications are possible between nodes in both directions (i.e. a duplex connection), some parties have proposed that the FDDI-II standards facilitate the use of simplex connections as well. Simplex connections are intended to connect single-attached stations. The intent of the simplex connection scheme is to permit the transmission of ring information through stations on a side lobe. Within the side lobe, communication would be possible in only one direction. Thus, when the lobe is in operation, all information within the ring would pass directly through each station on the side lobe.

Since the handshaking procedure discussed above for a duplex connection is not possible in a simplex connection, the connection management sequence for a simplex connection is necessarily much simpler than that required for a duplex connection. A proposed simplex connection sequence is shown in FIG. 2a, while FIG. 1 shows the required PCM states for both simplex and duplex connections. As seen therein, the Connect, Next, Signal, and Join states are all skipped entirely in the simplex connection.

Since FDDI standards have not yet been finalized, and indeed are likely to be subject to change for some time, it is desirable for system designers to have a single chip set that can not only accommodate each of these different connection management sequences, but also remains adaptable to accommodate emerging FDDI standards and specialized user requirements.

SUMMARY OF THE INVENTION

Accordingly, one of the primary objects of the present invention is to provide a controllable interface that permits the user to exercise some control over the operation of the PCM state machine and the connection management sequence.

To achieve the foregoing and other objects and in accordance with the purpose of the present invention, a physical layer controller having a Physical Connection Management (PCM) entity therein is disclosed. In one aspect of the invention, the PCM includes a PCM State Machine which the user can control to be paused after entering any given state. In another aspect of the invention, the user can force a state transition by writing the desired new state into a state register. These features permit the user to control the state transitions as well as the connection management sequence. Such control will be particularly useful to accommodate further changes to the FDDI standard, custom requirements and debugging during system design. In a preferred embodiment, user initiated state transitions can occur while the PCM State Machine is paused.

In a method aspect of the invention, the occurrence of a state transition is detected during the connection management sequence. The controller then determines whether a state pause has been requested for the newly entered state. When a state pause has been requested, the state machine is paused when it enters the associated state.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 3:
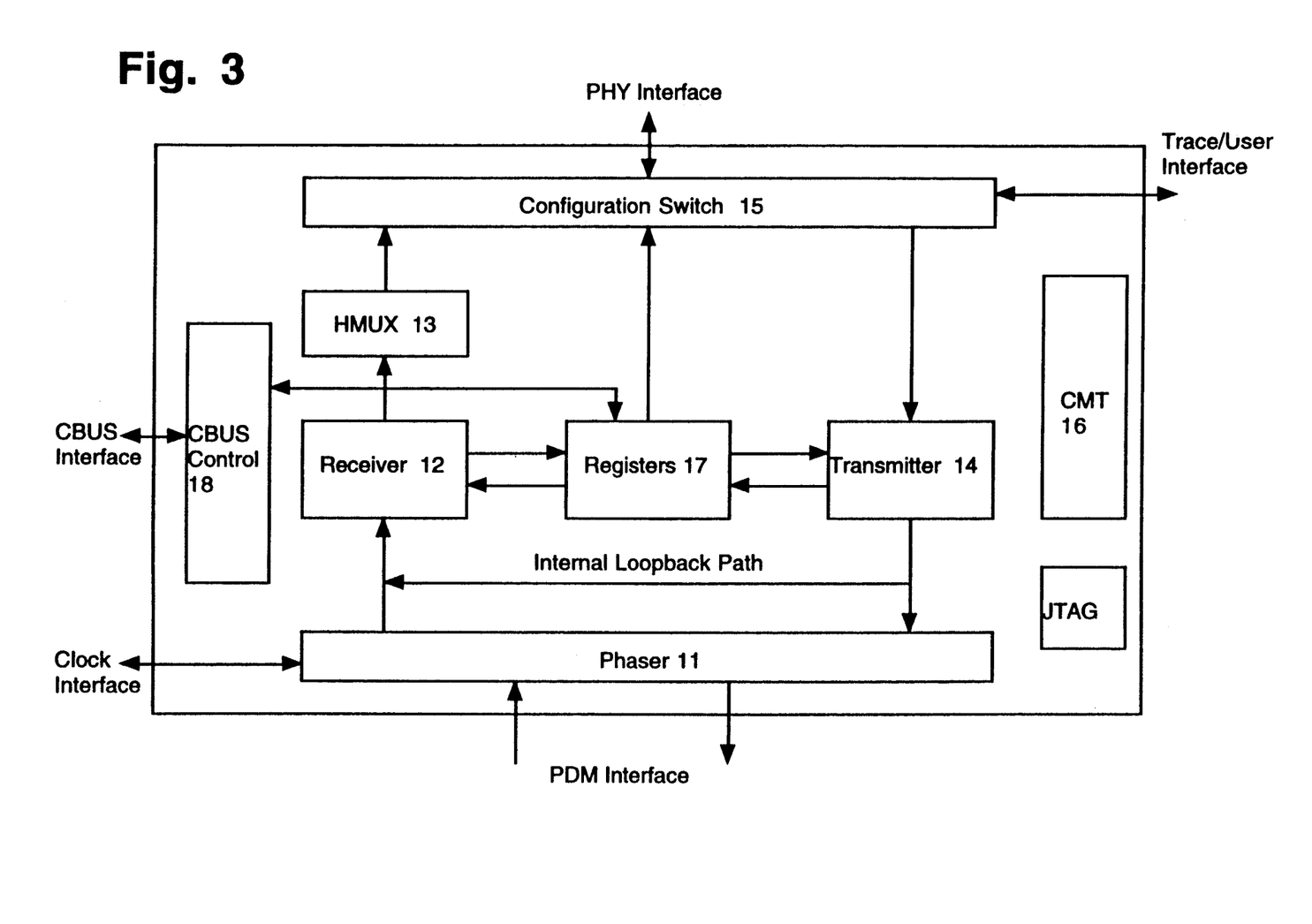
FIG. 3 is a block diagram of a Physical Layer Controller.

FIG. 3 shows a block diagram of a Physical Layer Controller (PLAYER TM) 10 which implements the physical function as defined by the Fiber Distributed Data Interface (FDDI) protocol (ANSI X3T9.5). The Physical Layer Controller 10 has several primary blocks including: a phaser 11, a receiver 12, a hybrid Multiplexor (HMUX) 13, a transmitter 14, a configuration switch 15, configuration management (CMT) 16, a multiplicity of storage registers 17 and a control bus interface 18.

The phaser 11 accepts a serial binary 125 MBit/sec Non-Return-To-Zero-Invert-On-Ones (NRZI) data stream from an external source, through a serial port that connects with the FDDI network fiber optic transmission medium. The phaser 11 establishes the 5-bit symbol boundaries for the serial bit stream and synchronizes the upstream station's clock to the local clocks of the Physical Layer Controller 10.

The receiver 12 accepts serial binary information from either the phaser 11 or from the transmitter 14 via one of two internal loopback paths. When necessary, the receiver 12 converts the information stream from the (NRZI) format utilized on the FDDI medium to Non-Return-To-Zero (NRZ) format used internally by the receiving station and decodes the NRZ data from external 5B coding to internal 4B coding. The receiver 12 also performs line state detection, link error detection and presents the data to the configuration switch 15 as internally coded symbol pairs.

The hybrid multiplexor 13 performs the functions of an HMUX as defined in the ANSI X3T9.5 Hybrid Ring Control Draft Proposed American National Standard. Therefore, the HMUX processes received cycles and determines where the information within a received cycle should be sent.

The transmitter 14 accepts information characters as symbol pairs from the internal 4B coding to the external 5B coding, filters out code violations in the information stream and redistributes Idle bytes which were added or deleted by the elasticity buffer. In addition, the transmitter 14 is capable of generating Idle, Master, Halt, Quiet or other user defined symbols. The transmitter 14 also converts the information stream from NRZ to NRZI and presents it to either the receiver 12 via one of the internal loopback paths or to the FDDI fiber optic medium as a serial bit stream.

The primary function of the configuration switch 15 is to route the information flow to support multiple station configurations for different station types without external logic. The control bus interface 18 allows the user to program the configuration switch 15, to enable and disable functions within the receiver 12 and the transmitter 14, to report line states and link errors detected by the receiver 12 and to report error conditions.

Figure 4:
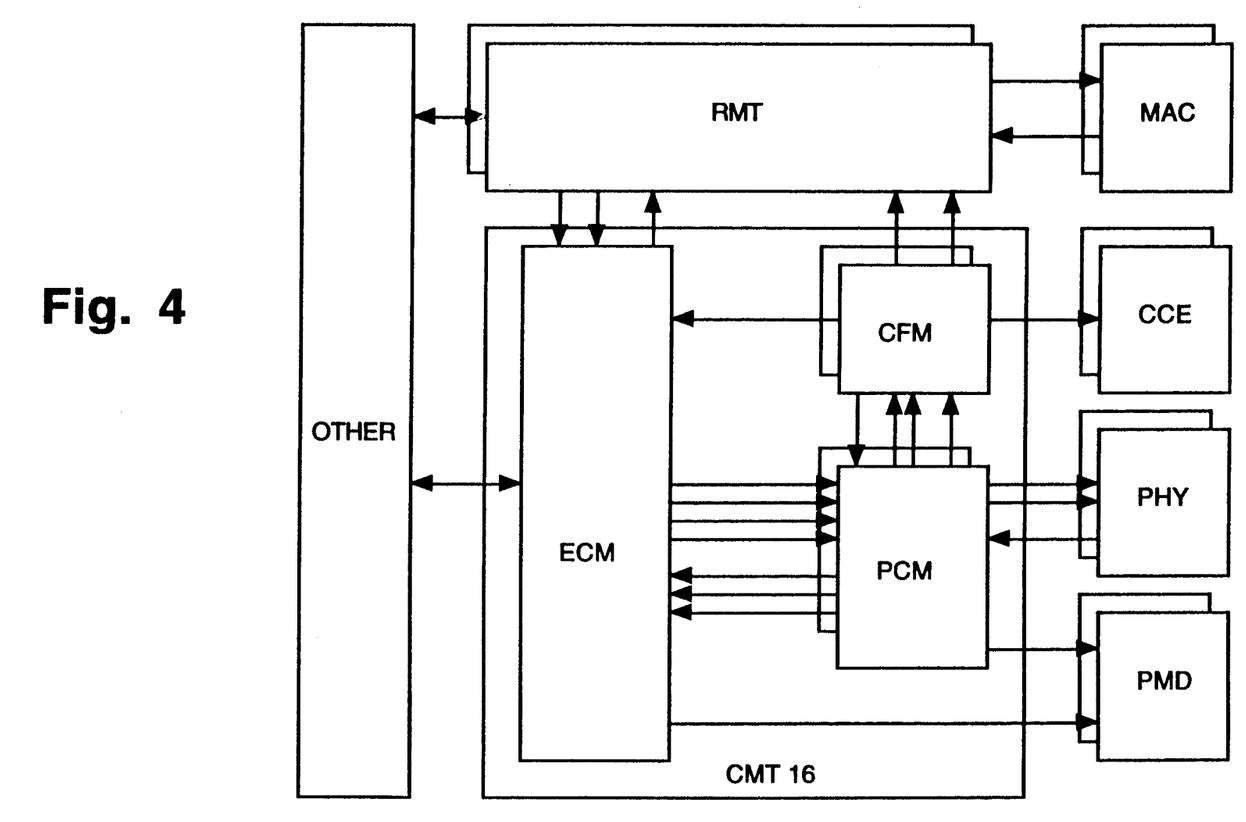
FIG. 4 is a block diagram of the Connection Management Structure within the Physical Layer Controller.

Referring next to FIG. 4, the Connection Management entity (CMT) 16 will be briefly described. In accordance with the FDDI protocol, the CMT 16 includes an Entity Coordination Management entity (ECM), a plurality of Physical Connection Management entities (PCM) and a plurality of Configuration Management entities (CFM). Within the FDDI protocol, one PCM is provided for each port, while one CFM is provided for each resource (i.e. port or MAC).

The Connection Management entity 16 communicates with a variety of other entities within the station, including the Ring Management (RMT), the Configuration Control Element (CCE), the Physical Layer (PHY), the Physical Medium Dependent Layer (PMD) and others. A more detailed explanation of the interrelationship of these entities is described in the previously cited ANSI FDDI Station Management Standard. However, since these relationships are not particularly relevant to the present invention, they will not be described herein.

A number of data registers 17 are provided to facilitate the control and operation of the Physical Layer Controller 10. Each data register 17 includes 8 or 16 bits that store information about the system. Most of the registers are not directly related to the operation of the PCM and many of the registers relating to the PCM are not directly relevant to the present invention. Further, the actual significance of the contents of the registers may vary a great deal depending upon the desired features of the Physical Layer. Therefore, only the registers (and segments thereof) that are relevant to the present invention will be described herein.

The data registers 17 include a Control Register 21, a Condition Register 22, a Condition Mask Register 23, a Status Register 24, a State Register 25, a Signal Register 27 and a State Pause Register 29.

Figure 5:
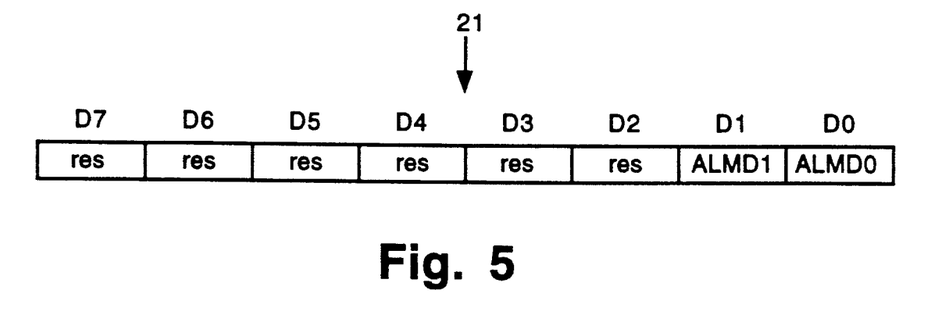
FIG. 5 is a diagram illustrating the contents of the Control Register.

As seen in FIG. 5, two bits of the Control Register 21 are used to indicate the network configuration(s) permitted by the associated station. In the described embodiment, these bits are located in bits D1 and D0 of the Control Register 21 and are labeled ALMD1 and ALMD0 (for allowed mode bit one and allowed mode bit zero). The configuration modes that can be defined by these two bits include, None (0,0), a simplex connection (0,1); a duplex connection (1,0) or either a simplex or a duplex connection (1,1). The Control Register may always be read or written into by the user. Therefore, the user can select the connection configuration(s) of the station that are permitted at any time. The remaining bits D2-D7 of the Control Register 21 are reserved (res) for other purposes.

Figure 6:
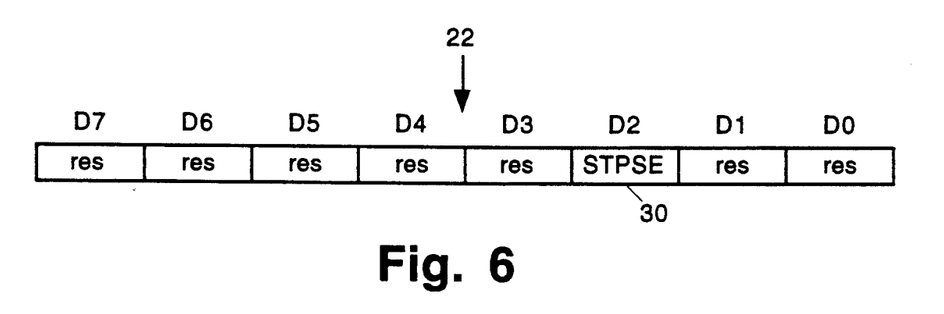
FIG. 6 is a diagram illustrating the contents of the Condition Register.

FIG. 6 shows the Condition Register 22. Bits in the Condition Register 22 are flags that can always be read or written into by the user. Bit D2 of the Condition Register 22 is the state pause flag 30 (labeled STPSE in the drawing). The remaining bits in the Condition Register 22 are reserved to act as other flags. The state pause flag 30 is set any time that the PCM State Machine is paused.

It is noted that a pause occurs when an internal pause flag is set in the PCM. The internal pause is cleared either by writing a new state value into the State Register 25 or writing a value indicative of a PC_Continue signal into the Signal Register 27 as will be described below. The user is then responsible for clearing the state pause flag 30.

Figure 7:
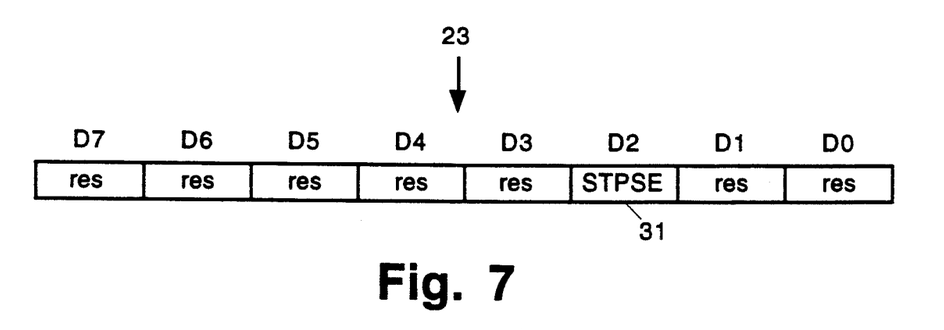
FIG. 7 is a diagram illustrating the contents of the Condition Mask Register.

The Condition Mask Register 23 shown in FIG. 7 is closely related to the Condition Register 22. Specifically, each bit in the Condition Mask Register 23 has a corresponding bit in the Condition Register 22. The Condition Mask Register is intended to facilitate the generation of interrupts. In operation, bits that are masked "off" (i.e. zeros) will not generate an interrupt, regardless of whether their corresponding bit in the Condition Register 22 is set. On the other hand, bits that are masked "on" (i.e. ones) will generate an interrupt anytime their corresponding bit in the Condition Register 22 is set. The user has complete freedom to read and write into the Condition Mask Register 23. In this way, the user can decide which conditions it wishes to be informed of. Thus, when the State Pause Interrupt flag 31 is set to zero, the user will not be informed of state pauses. On the other hand, if the State Pause Interrupt flag 31 is set to one, an interrupt will be generated anytime a state pause occurs. The user can then define the specific actions that are desired in response to the state pause.

Figure 8:
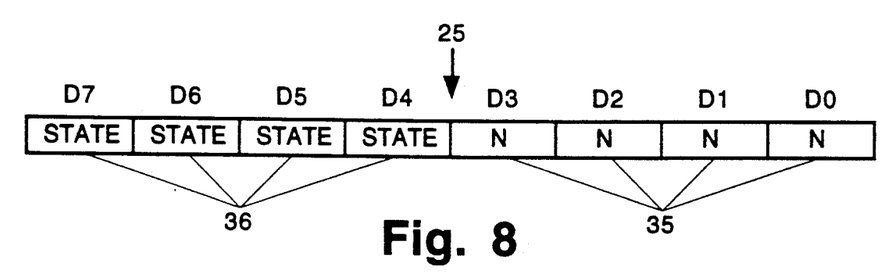
FIG. 8 is a diagram illustrating the contents of the State Register.

Turning next to FIG. 8, the State Register 25 will be described. The State Register 25 indicates the current PCM condition. The first four bits of the State Register (bits D0-D3) provide a pseudo code index 35. That is, they indicate the bit number of Pseudo Code signal that is currently being exchanged. The remaining four bits of the State Register (bits D4-D7) form a State index 36, which indicates the current PCM state. Within the State index, zero represents the "Off" state. One represents the "Break" state. Two represents the "Trace" state and three the "Connect" state. Four represents the "Next" state, five the "Signal" state, six the "Join" state, seven the "Verify" state and eight the "Active" state. Of course, if any additional states are desired, such as a maintenance state, they could be added as well.

One important feature of the State Register is that it is a Read/Write register that can be read or written into by the user at any time. As will be described in more detail below, this permits the user to write a new state and/or pseudo code bit number into the State Register 25. In this way, the user can override the default logic and vary the PCM's connection management sequence. Thus, the user can exercise almost complete control over the flow of the State Machine. The user is free to write into the State Register both while the state machine is operating and when the state machine is paused. In the described embodiment, writing into the State Register forces an immediate state transition. However, in alternative embodiments, such user control could be limited to times when the state machine is paused.

Figure 9:
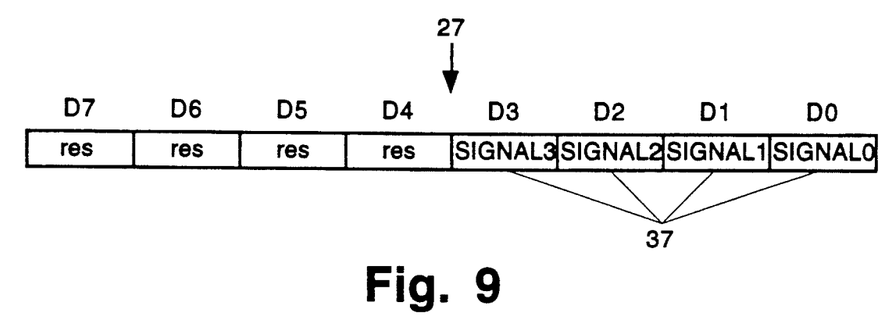
FIG. 9 is a diagram illustrating the contents of the Signal Register.

The contents of the Signal Register 27 are illustrated in FIG. 9. As seen therein, bits D0-D3 form a four bit PC_Signal symbol 37. When the PC_Signal symbol 37 is set to "zero", it represents a PC_Stop signal, which forces the state machine to the Off state. A "one" represents a PC_Start signal which forces the state machine to the Break state. A "two" represents a PC_Trace signal, which forces the state machine to the Trace state. It is noted, however, that the PC_Trace signal is only allowed when the machine is in the Active state. Finally, a "fifteen" represents a PC_Continue signal, which removes a pause condition, thereby allowing the state machine to proceed. The remaining numbers 3-14 are reserved and have no special meaning. Similarly, the remaining four bits of the Signal Register 27 (i.e. bits D4-D7) are reserved.

Like the State Register 25, the Signal Register 27 is a read/write register that may always be written into by the user. This permits the user to insert a PC_Stop, a PC_Start, or a PC_Trace command anytime the PCM State Machine is paused. Further, by providing a user activated PC_Continue function, operation of the state machine may readily be resumed after a state pause.

Figure 10:
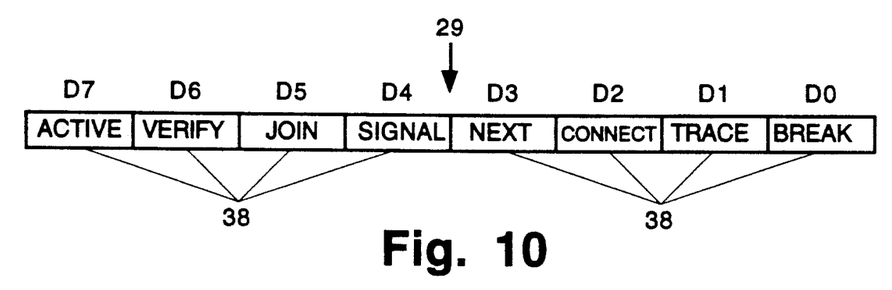
FIG. 10 is a diagram illustrating the contents of the State Pause Register.

Referring next to FIG. 10, the State Pause Register 29 will be described. The State Pause Register 29 allows the user to pause the PCM State Machine in any particular state. This enables the user to provide external software that controls the operation of the State Machine. After the State Machine has been stopped at a particular break point, it may be permitted to proceed in two ways. The first is to issue a PC_Continue signal by writing the symbol "fifteen" into the PC_Signal portion 37 of the Signal Register 27. The second way to resume operation of the state machine is to write a new value that is different from the current value, into the State index 36 of State Register 25. Writing such a value into the State Register forces the state machine into the given condition and terminates the state pause.

The State Pause Register 29 has eight bits, each of which is a State Pause Mask 38 that corresponds to an associated machine state of the PCM. Anytime the PCM State Machine enters a new state, the State Pause Mask 38 corresponding to the new state is polled to determine whether a pause should occur. When the State Pause Mask 38 corresponding to a particular machine state is set to "one", then the state machine will pause after entering that state. On the other hand, if the State Pause Mask 38 corresponding to a particular machine state is set to "zero", then the state machine will proceed uninterrupted when the associated state is entered. When the PCM State Machine pauses, the internal pause flag is set and the state pause flag 30 in the Condition register 22 is also raised.

In the embodiment of the State Pause Register 29 shown in FIG. 10, bit D0 represents the Break state. Thus, anytime the bit D0 is set to "one", the PCM State Machine will pause after entering the Break state. Similarly, bit D1 represents the Trace state, bit D2 the Connect state, bit D3 the Next state, bit D4 the Signal state, bit D5 the Join state, bit D6 the Verify state and bit D7 the Active state. Thus, the user can pause the PCM state machine as it enters any of these states merely by setting the state pause register bit associated with the state in which a pause is desired. When this feature is combined with the attributes of the State Register 25 described above, the user is given control to vary the connection management sequence in virtually any manner desired. That is, when the state machine is paused, the user can force the state machine into a new state by writing the desired new state into the State Register 25. Similarly, the pseudo code can be altered by writing the index of the desired pseudo code bit into the pseudo code index 35 of the State Register 25. It is anticipated that the user would develop suitable software to control the operation of the PCM while the state machine is paused. This gives the user the ability to provide virtually any desired connection management sequence.

Figure 11:
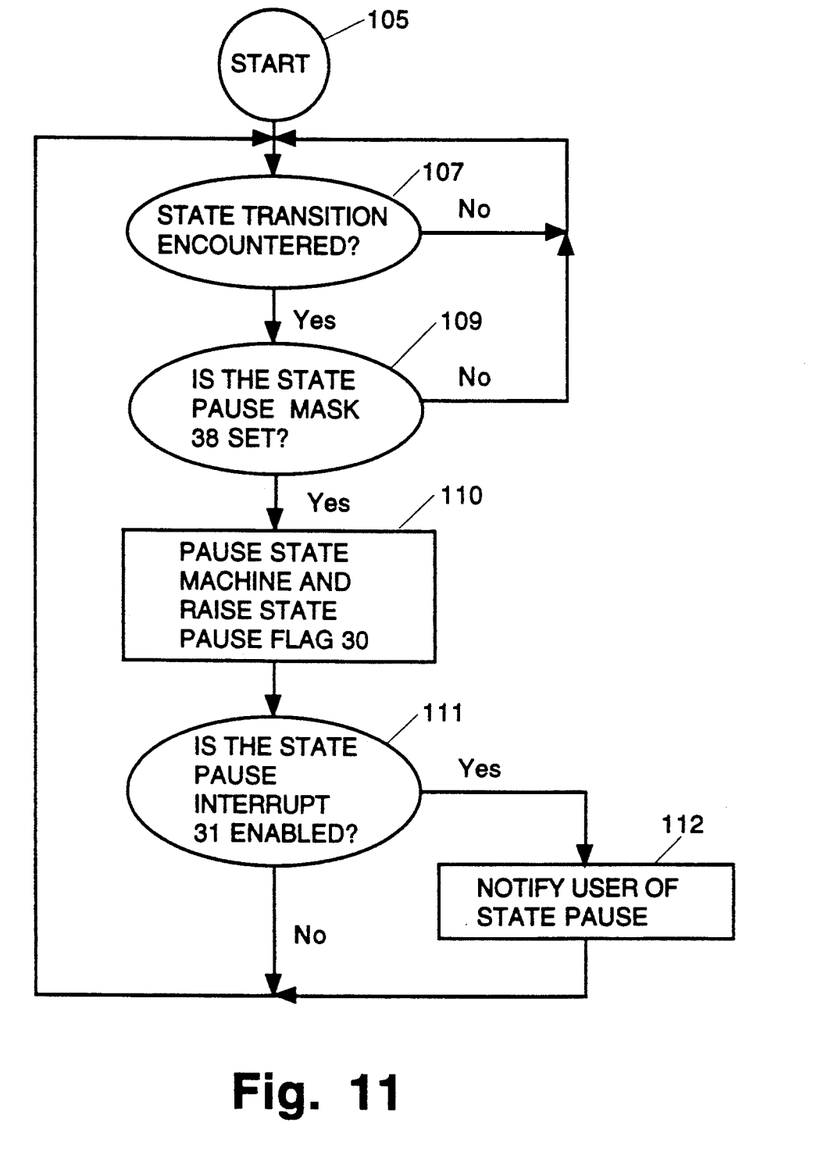
FIG. 11 is a flow diagram illustrating the process followed to determine whether a state pause has been requested when a state transition occurs during the Physical Connection Management function.

Referring next to FIG. 11, the general flow of the state pause logic will be described. Initially, in step 105, the process begins. In step 107, the PCM determines whether a state transition has occurred. If not, the state pause logic waits for a state transition to occur. When a transition occurs, the State Pause Register 29 is checked to determine whether the state pause mask 38 corresponding to the new state has been set. Step 109. If not, the PCM transmits the signals required in the next state and the flow of the state pause logic returns to step 107 to wait for the next state transition.

When the state pause mask 38 corresponding to the new state is set, the state pause flag 30 in the Condition Register 22 is set in step 110. Then, in step 111, the Condition Mask Register 23 is checked to determine whether the State Pause Interrupt flag 31 is set. That is, has the interrupt been enabled. If so, in step 112, the user is notified of the state pause. When the State Pause Interrupt 31 is not set, or alternatively after the user has been notified of a state pause in Step 112, the flow returns to step 107 to wait for the next state transition.

Figure 12:
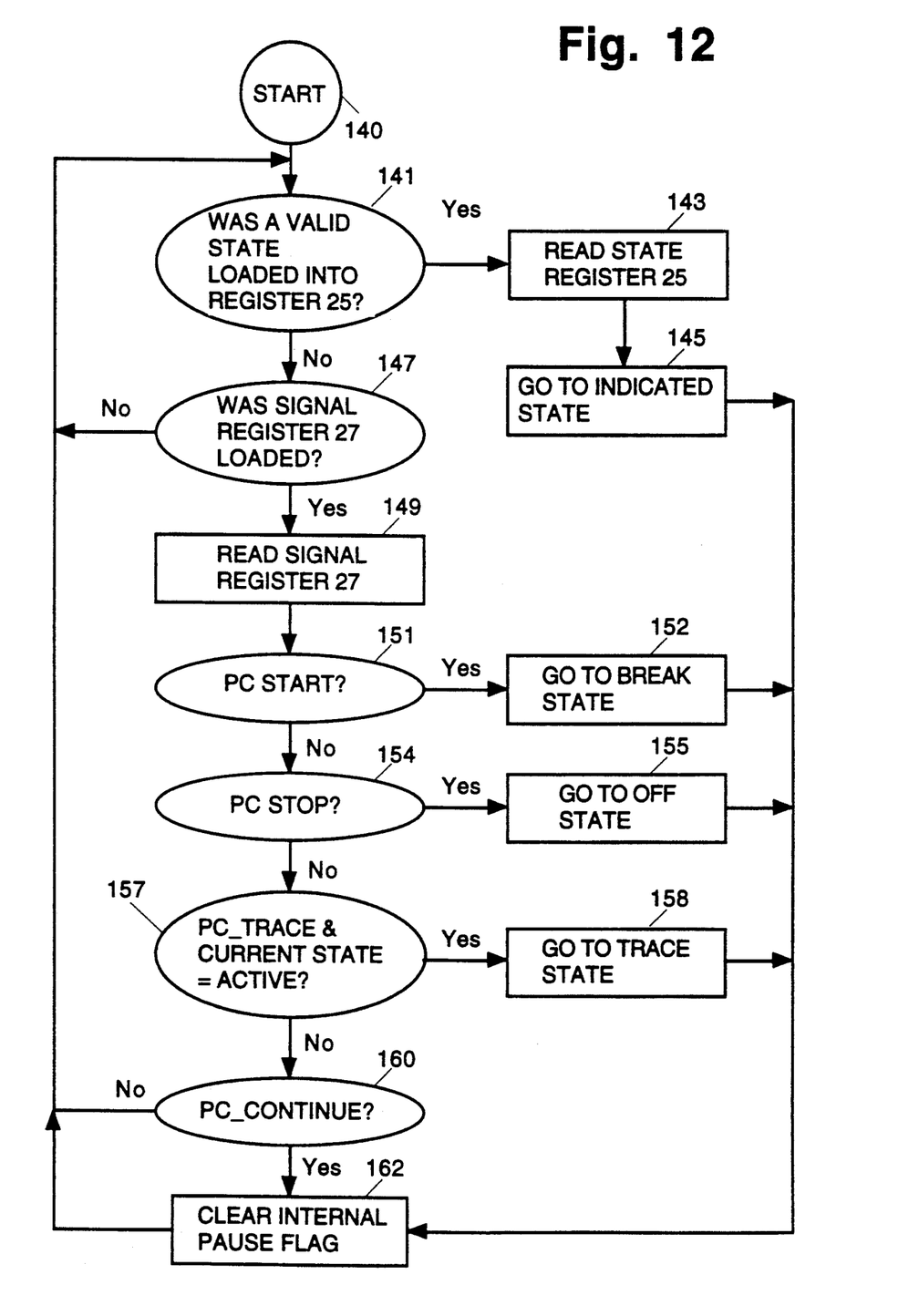
FIG. 12 is a flow diagram illustrating the process followed to determine whether the user has requested a state change.

Referring next to FIG. 12, the return from user control to PCM control will be described. The process starts at step 140. In step 141, it is determined whether a valid value has been loaded into the State register 25. If so, in step 143, the state index 36 of State Register 25 is read. If a value indicative of a valid state has been entered into the state index 36, then the PCM state machine transits to the indicated state in step 145. If a valid value has not been loaded into the state index 36, then in step 147 it is determined whether a value has been loaded into the PC_Signal symbol 37 in the Signal register 27. If so the PC_Signal symbol 37 in signal register 27 is read in step 149. If not, the logic returns to step 141 and the logic waits until a value is loaded into either the state index 36 or the PC_Signal symbol 37.

When a new PC_Signal value is written into the Signal register, the logic reads the PC_Signal symbol and then transitions to step 151 where it begins to determine the nature of the new signal. Initially, in step 151, the PC_Signal symbol is checked to determine whether it is a PC_Start signal. If so, the PCM transits to the BREAK state at step 152. If not, in step 154, it is determined whether the value of the PC_Signal symbol is equivalent to PC_Stop. If so, the PCM moves to the OFF state in step 155. If PC_Stop has not been selected, then in step 157, it is determined whether PC_Signal is equivalent to PC_Trace. It is noted that PC_Trace can only be selected after the PCM is in the active state as described above. If PC_Trace has been selected, then the PCM moves to the trace state in step 158. If the PC_Signal symbol is not value indicative of a PC_Trace symbol, then in step 160, it is determined whether the PC_Signal symbol in Signal register 27 is a PC_Continue signal. If so, the PCM state machine is resumed in its current condition. If the PC_Signal symbol does not contain any of the foregoing signals, then an invalid value has been written into the PC_Signal symbol and the logic returns to Step 141 where it resumes looking for the event of a value being written into either the State register 25 or the Signal register 27. The described loop is then repeated until an appropriate new value is written into either the state index 36 or the PC_Signal symbol 37.

If PC_Continue was selected in step 160, then the internal pause flag is cleared (step 162) and the CPU returns to step 141 where it begins looking for the next forced state transition. Similarly, anytime the user action directs the PCM to a specific state as indicated in steps 145, 152, 155 and 158, the internal pause flag 30 is cleared in step 162. Again, after a state transition has been completed, the logic returns to step 141 where it awaits the next requested state transition.

It is noted that to simplify this description these steps have been described as though they occur sequentially. However, in the actual logic, it is preferable to have the Signal and State register loading detection steps occur simultaneously. It is also noted that no attempt has been made to show a specific logic that implements the present invention since such logic can be readily fabricated by those skilled in the art.

Although only one embodiment of the present invention has been described in detail, it should be understood that the present invention may be embodiment in many other specific forms without departing from the spirit or scope of the invention. Particularly, the invention has been described in the embodiment in which the user may force a pause upon the entry to any state within the connection management sequence. However, it is also comtemplated that the user could be given less than complete control. For example, the user could be given control only upon the entry into certain selected states. Further, the actual contents and sizes of the registers may be varied extensively.

The physical layer controller in the described embodiment is part of an FDDI station. It should be understood that the term station in this context is not limited to work stations, but rather may also include concentrators and any other device that can be added as an active part of an FDDI based data transmission ring. Therefore, it should be apparent that the present examples are to be considered as illustrative and not restrictive, and the invention is not to be limited to the details given herein, but may be modified within the scope of the appended claims.

What is claimed is:

1. A physical layer controller for controlling the physical layer of a station that is capable of insertion into a data transmission network that is capable of operating substantially in accordance with the FDDI protocol, the physical layer controller including a physical connection management entity that includes a PCM state machine and is capable of executing a connection management sequence in accordance with the FDDI protocol, the physical layer controller further comprising:

a plurality of registers, the registers including a state pause register that may be selectively written into by the user to indicate which state the PCM state machine should pause in, wherein when the PCM state machine enters an indicated pause state, the PCM state machine will automatically pause in that state.

2. A physical layer controller as recited in claim 1 wherein said plurality of registers further includes a state register that the user may selectively write into in order to indicate a new state which the PCM state machine should transit into, wherein when the user writes a value indicative of a new state into the state register, the PCM state machine will automatically transition into the new state.

3. A physical layer controller as recited in claim 2 wherein the state register can be written into while the PCM state machine is paused.

4. A physical layer controller as recited in claim 1 wherein the state pause register includes a plurality of state pause bits that the user may selectively set to a first or a second level, each state pause bit being associated with a particular state of the PCM state machine, wherein when the PCM state machine enters a state associated with a particular state pause bit that is set to said first level, the PCM state machine will automatically pause in that state and wherein when the PCM state machine enters a state associated with a particular state pause bit that is set to said second level, the PCM state machine will not automatically pause in the associated state.

5. A physical layer controller as recited in claim 2 wherein the state register can be both read and written into by the user, the state register containing a state index that is arranged to indentify the current state of the PCM state machine during the connection management sequence, wherein the state of the PCM state machine can be forcibly changed by the user by writing a value corresponding to the desired new state into the state index during the connection management sequence.

6. A physical layer controller as recited in claim 5 wherein the state register further contains a pseudo code index that indicates a bit number associated with a pseudo code signal that is being exchanged by the physical layer controller during the connection management sequence, wherein pseudo code information being transmitted can be altered by the user by writing a value corresponding to a desired new pseudo code bit number into the pseudo code index.

7. A physical layer controller as recited in claim 6 wherein the state of the PCM state machine is automatically forcibly changed when a value corresponding to a desired new state is written into the state index.

8. A physical layer controller as recited in claim 1 wherein the plurality of registers further includes a condition mask register having a state pause mask bit that enables a user to choose whether an interrupt should be generated when a state pause occurs.

9. A physical layer controller as recited in claim 1 wherein the plurality of registers further includes a condition register having a state pause flag therein, the state pause flag being automatically set anytime the PCM state machine is paused.

10. A physical layer controller as recited in claim 9 wherein the plurality of registers further includes a condition mask register having a state pause mask bit that enables a user to choose whether an interrupt should be generated when a state pause occurs, wherein when the state pause flag is raised while the state pause mask bit is set to a first level an interrupt is generated and wherein when the state pause flag is raised while the state pause mask bit is set to a second level, an interrupt is not generated.

11. A physical layer controller as recited in claim 1 wherein the plurality of registers further includes a programmable signal register that can be read and written into by the user, the signal register having a multibit signal index arranged to represent various signals that initiate a state change within the PCM state machine, wherein a selected state change is initiated by writing an index number associated with the selected state change signal into the signal index.

12. A physical layer controller as recited in claim 1 further comprising a receiver for detecting line state signals, a transmitter for transmitting line state signals, a configuration switch for setting the configuration of the physical layer controller and a control bus interface for permitting a user to program the configuration switch.

13. A physical layer controller for a station capable of insertion into a data transmission network that is capable of operating substantially in compliance with the FDDI protocol, the physical layer controller including a physical connection management entity having a state machine capable of executing a connection management sequence substantially in accordance with the FDDI protocol, the physical connection management entity comprising:

pause means for permitting the user to selectively pause the state machine after a state transition occurs; and transition means for permitting the user to vary the connection management sequence.

14. A physical layer controller as recited in claim 13 wherein the pause means includes a state pause register that a user may selectively write into in order to indicate which state the state machine should pause in, wherein when the state machine enters an indicated pause state, the physical connection management state machine will automatically pause in that state.

15. A physical layer controller as recited in claim 13 wherein the transition means includes a state register that the user may selectively write into in order to indicate a new state which the state machine should transit into, wherein when the user writes a value indicative of a new state into the state register, the physical connection management state machine will automatically transit into the new state.

16. A physical layer controller as recited in claim 13 wherein the transition and pause means cooperate such that when a user directs a state transition while the state machine is paused, the state pause will be automatically cleared.

17. A method of connecting a first station to a data transmission ring of a local area network that operates substantially in compliance with the protocol of a FDDI connection management function, wherein the first station includes a physical connection management entity having a state machine that transits through a plurality of machine states during a connection management sequence and is capable of connection to a neighboring station by a data transmission line that forms a part of the data transmission ring, the method comprising the steps of:

detecting the occurrence of a state transition during the connection management sequence;

determining whether a state pause has been requested for the newly entered state; and     pausing the state machine when a state pause has been requested for the newly entered state.

18. A method as recited in claim 17 wherein when a state pause occurs, the method further comprises the steps of:

checking to determine whether a state pause interrupt request has been made; and     generating an interrupt when a state pause interrupt request has been made.

19. A method as recited in claim 17 wherein when a state pause occurs, the method further comprises the steps of:

determining whether a signal value indicative of a desired connection management control signal has been entered into a signal register; and     transitioning the state machine to a state that transmits the desired control signal when a signal value indicative of a desired connection management control signal has been entered into the signal register.

20. A method as recited in claim 19 wherein a plurality of signal values can be stored in the signal register, each signal value representing a different desired control signal.

21. A method as recited in claim 17 wherein when a state pause occurs, the method further comprises the steps of:

determining whether a state value indicative of a desired new state has been entered into a state register; and     forcing the state machine to transit to the desired new state indicated by the state value when the state value has been entered into the state register.

22. A method as recited in claim 21 wherein a plurality of state values can be stored in the state register, each state value representing a different desired new state.

23. A method as recited in claim 22 further comprising the steps of:

determining whether a signal value indicative of a desired connection management control signal has been entered into a signal register; and     transitioning the state machine to a state that transmits the desired control signal when a signal value indicative of a desired connection management control signal has been entered into the signal register.

24. A method as recited in claim 17 further comprising the steps of:

setting a state pause flag anytime the state machine is paused; and     clearing the state pause flag when the state pause is terminated.

* * * * *